(12) United States Patent
Windust (10) Patent No.: US 9,350,745 B2
(45) Date of Patent: May 24, 2016

(54) METHOD AND SYSTEM FOR MANAGING USER SECURITY PERMISSIONS FOR ACCESS TO RESOURCES

(71) Applicant: Jon Windust, Melbourne (AU)

(72) Inventor: Jon Windust, Melbourne (AU)

(73) Assignee: COGWARE PTY LTD, Melbourne, Victoria (AU)

( * ) Notice: Subject to any disclaimer, the term of this patent is extended or adjusted under 35 U.S.C. 154(b) by 0 days.

(21) Appl. No.: 14/039,527

(22) Filed: Sep. 27, 2013

(65) Prior Publication Data

US 2015/0095979 A1    Apr. 2, 2015

(51) Int. Cl.
  *H04L 29/06* (2006.01)
  *H04L 29/08* (2006.01)
(52) U.S. Cl.
  CPC ........... *H04L 63/104* (2013.01); *H04L 63/04* (2013.01); *H04L 63/10* (2013.01); *H04L 67/20* (2013.01)
(58) Field of Classification Search
  CPC ......... H04L 63/102; H04L 63/00; H04L 9/14; H04L 9/0833; H04L 9/0825; H04L 2209/76; H04L 63/10; H04L 63/04; H04L 63/104; H04L 67/10; H04L 67/2011; G06F 21/6218
  USPC ........................................................ 726/3, 4
  See application file for complete search history.

(56) References Cited

U.S. PATENT DOCUMENTS

| | | | |
|---|---|---|---|
| 2005/0114672 A1* | 5/2005 | Duncan et al. | 713/182 |
| 2009/0034463 A1* | 2/2009 | Rao | 370/329 |
| 2009/0158041 A1* | 6/2009 | Kang | H04L 9/0833 713/171 |
| 2009/0260060 A1* | 10/2009 | Smith et al. | 726/3 |
| 2009/0271870 A1* | 10/2009 | Vepsalainen | 726/27 |
| 2011/0165858 A1* | 7/2011 | Gisby | H04L 63/10 455/411 |
| 2012/0159572 A1* | 6/2012 | Patel et al. | 726/3 |
| 2012/0311697 A1* | 12/2012 | Swingler et al. | 726/17 |
| 2013/0198296 A1* | 8/2013 | Roy et al. | 709/206 |
| 2014/0129942 A1* | 5/2014 | Rathod | 715/720 |

* cited by examiner

*Primary Examiner* — Don Zhao
(74) *Attorney, Agent, or Firm* — Ohlandt, Greeley, Ruggiero & Perlo, L.L.P.

(57) ABSTRACT

Disclosed is a method and system of managing user security permissions for access to resources accessible over a communications network, to participate in a designated task or conversation relating to the resources. The method and system include: assembling resources relating to the designated task or conversation into a collection and allocating security permissions for users to access said resources in the collection over the network based on whether the users are active or passive participants in the task or the conversation. Active participants have been invited to participate in the task or the conversation and passive participants have not been invited to participate in the task or the conversation, and security permissions allocated for each of the users to access said resources in the collection to the providers of the resources are communicated, such that the providers set the security permissions for each of the users to access the resources.

14 Claims, 9 Drawing Sheets

METHOD AND SYSTEM FOR MANAGING USER SECURITY PERMISSIONS FOR ACCESS TO RESOURCES

CROSS-REFERENCED APPLICATION

This application claims priority to U.S. Provisional Application Ser. No. 61/707,412, filed on Sep. 28, 2012, that is incorporated herein in its entirety by reference thereto.

BACKGROUND

1. Field of the Disclosure

The present disclosure relates to a method and system for managing user security permissions for access to resources that are provided by providers, to participate in a designated task or conversation relating to the resources, and are accessible over a communications network. The present disclosure is of particular, but not exclusive, application in automatically allocating security permissions for users to access the resources based on whether the users are active or passive participants in the task or conversation so that the providers can set the security permissions for these users to access the resources.

2. Description of the Background Art

Communications technology, the Internet and now cloud computing, for instance, have increased our ability to produce and communicate information—so much so that we now deal with a flood of information on a daily basis. We are increasingly using these technologies to collaborate with more people on many different things. However, while the ability to produce and communicate information has exploded, the security model for controlling access to the information has remained largely unchanged.

For example, one existing method of controlling access to information, or resources, is based around the notion of a domain. That is, controlling access by storing the resources in domains and controlling user access to each domain. However, people typically collaborate on information across multiple domains and thus to request user access to each different domain can be slow and cumbersome. For example, people may collaborate within their organisation and within various interest groups, parents may collaborate with their children to help with homework assignments, university students may collaborate with each other on projects, and couples may collaborate to plan a holiday. In these existing examples, users may collaborate across more than one domain but each domain is orientated towards a different goal. This domain based model is, in fact, grounded on an old world view of how people should be organised to achieve some goal. The domain model, however, is slow and convoluted and does not adequately support the need to quickly collaborate with many people on many different things. It thus cannot support both speedy collaboration and tight control over security of resources and information.

In another existing example, to enable, say, speedy collaboration, the domain model can be configured with loose security. For example, a university student who needs to collaborate with other students on a project may impose almost no security over their information. Thus, to collaborate on a collection of resources, the student may email the information, track any changes, review changes, accept changes and try to keep versions in sync. Once the documents are emailed, there is no control over what happens to them; information may be edited unintentionally or, worse still, mischievously used by others. The documents can be used by anyone who gets access to them. The original author can have no idea who gets access to them and what they are used for. Accordingly, loose security is not suited to many applications where privacy of users, theft or authenticity of information is concerned. As an alternative, the students may choose to use a cloud based service such as Google Docs™ where security is, however, generally assigned one document at a time.

There are also many existing examples of, say, corporate and government organisations which impose tight security controls over information access. However, when the domain model is configured with tighter control over resource access, the bureaucratic and slow process required to gain access to the resources can prevent efficient and productive collaboration. Indeed, these organisations, particularly the ones where work occurs in virtual silos, may well find it difficult to encourage efficient and creative collaboration between members of the organisation using the existing domain based security model for access to resources. Moreover, the typical methods and processes for selecting, sharing and assigning permissions on resources such as documents, spread-sheets, and presentations is time-consuming, convoluted and can be stifling to the users.

Furthermore, in the above corporate environment example, resource access permissions can be assigned to people individually or on the basis that they are the member of a group. The group, however, must be manually defined and members manually entered. For example, within an organisation, resources (e.g. files) are stored within domain servers. The organisation controls access to the resources by restricting access to those within their domain. Access is then further restricted by organisation hierarchy or group. For example, the Human Resources department has access to certain resources, the Finance Department to others, etc. The domain model, however, cannot support the need to collaborate on many different resources with many different people, some, say, openly and some with tight security requirements over a given period of time.

Previously, email has been a common collaboration tool to use. It has enabled massive increases in productivity and, in turn, creativity and innovation whilst other existing collaboration systems work on directory, hierarchy or group models. Nonetheless, email generally provides no control over security on the resources which are being collaborated on. Accordingly, there is still a need for considerable manual security administration which does not enable both fast paced and tight control over the security. Furthermore, as briefly mentioned, technologies such as Google Docs™ or Office 365™ readily enable collaboration on a resource, but it is still necessary to manually share and allocate permissions on the resource.

SUMMARY

According to one aspect of the present disclosure, there is provided a computer implemented method of managing user security permissions for access to resources that are provided by providers, to participate in a designated task or conversation relating to the resources, and are accessible over a communications network, the method including:

assembling resources relating to the designated task or the conversation into a collection;

allocating security permissions for users to access said resources in the collection over the network based on whether the users are active or passive participants in the task or the conversation, whereby the active participants have been invited to participate in the task or the conversation and the passive participants have not been invited to participate in the task or the conversation; and communicating the security permissions allocated for each of the users to access said resources in the collection to the providers of the resources, such that the providers set the security permissions for each of the users to access the resources.

It will be appreciated by those persons skilled in the art that the word "resources" is used to encompass information contained in, say, files, documents, spread-sheets, presentations, calendars, communications, information and also physical resources, such as printers, etc. That is, resources, such as files and web sites containing information, can be accessed for collaboration by the active and/or passive participants using the above method.

In addition, it will be appreciated by those persons skilled in the art that the word "task" encompasses activities, goals and plans that need to accomplished, as well as contributing to wikis (e.g., wiki web sites), events, blogs, and webpages. It will also be appreciated that the term "conversation" encompasses communications, such as posts and comments, in relation to the resources.

In an embodiment, the resources are hosted by providers in data communication with a controller for implementing the above method, and the controller is also in data communication with the users. That is, in the embodiment, users access the resources hosted by the providers over the Internet via the controller at the first instance for allocating security permission, which is interposed between the users and the providers to implement the method of access control. In another embodiment, the controller and the providers of the resources are hosted by the same system which is in data communication with the users. Nonetheless, once a user has been given permission to access a resource—for example by virtue of becoming an active participant in a conversation—they can then access that resource through the system or through the provider directly.

In an embodiment, the present disclosure applies a situation based security model for managing user security permissions for access to resources rather than the above described domain model. Accordingly, it removes the need to consider resources on a one-by-one basis and the need to manually share and set permissions on resources. Indeed, for users of the embodiment, it can also remove the need to, for example, email, track and synchronise versions of documents forming resources. That is, instead of sharing and allocating permissions to resources on a domain and organisation or group basis, it is done automatically based on the situational need of the users according to the method.

For example, if you are collaborating on a task with others in your organisation, but they are in a different department, instead of asking network administrators to create a new group, copy files to it, share them and set permissions, the resources will be automatically shared to those others by virtue of them being an active participant in a task. Also, if you are collaborating with individuals from another organisation, instead of having to email files, track and synchronise changes, resources will be automatically shared with those individuals by virtue of them participating in the same task or conversation. Furthermore, if you are a university student working on project with others, instead of manually sharing Google Docs™ and setting permissions, this will happen automatically by the mechanism described above. That is, others on the same project team as yourself, and the lecturer, will automatically receive access by virtue of being active participants in the conversation or task.

In an embodiment, the method further includes allocating said security permissions for the users to access said resources in the collection based on whether the users are members of a designated group with designated permissions for the resources in the collection. That is, the users can be individuals, part of groups and members of organisations and can either be active or passive participants in a conversation or task. As described, the active participants are those users that have been invited to participate in a collection for a designated task or conversation. Passive participants are those users that have not been invited to participate in a collection for a designated task or conversation, but may be able to participate on some level depending on a designated security configuration for the passive participants.

In an embodiment, the security permissions include permission policies of a security model to: view the resources; comment on the resources; edit the resources; delete the resources; control permissions for other users to the resources; and own the resources.

In an embodiment, the method further includes allocating said permission policies to any one of: users that are active participants in the task or the conversation and are members of a designated group; users that are active participants in the task or the conversation; users that have designated permissions for the resources; and users that are passive participants in the task or the conversation. The allocation of the permission policies is predetermined so that, for example, passive participants can only view the resources and active participants can edit the resources. This predetermined allocation of permission policies forms a security configuration, or security model, defining the types of access that can be allocated to the active and passive participants to access the resources.

In an embodiment, the method further includes the providers setting the permission policies based on the security permissions communicated thereto for any one of: users that are active participants in the task or the conversation and are members of a designated group; users that are active participants in the task or the conversation;

users that have designated permissions for the resources; and users that are passive participants in the task or the conversation.

In an embodiment, the permission policies set by the providers override the permission policies allocated to said users to access said resources in the collection.

In an embodiment, the method further includes translating said security permissions allocated for each of the users to access said resources in the collection to a provider model for use by the providers to set the security permissions for each of the users to access the resources.

In an embodiment, the method further includes interfacing with the providers to communicate the provider model so that the providers set the security permissions for each of the users to access the resources.

In an embodiment, the method further includes assembling data indicative of said active and said passive participants in the task or the conversation into the collection. Also, the method further includes assembling data indicative of communications on the resources created by the users participating in the conversation into the collection. It will be appreciated by those persons skilled in the art that the resources can be assembled into more than one collection and the users can participate in more than one task or conversation. In any event, the collections enable, say, communication, such as posts, about the resources and hence collaboration on the resources.

In an embodiment, the method further includes allocating the security permissions for said users to access the resources in the collection based on the data indicative of said active and said passive participants assembled into the collection.

In an embodiment, the method further includes removing the security permissions for said users to access the resources in the collection in response to the data indicative of said active and said passive participants being removed from the collection. That is, the embodiment controls both the automatic allocating and the removal of security permissions to users based on situational needs.

According to another aspect of the present disclosure, there is provided a system for managing user security permissions for access to resources that are provided by providers, to participate in a designated task or conversation relating to the resources, and are accessible over a communications network, the system including a controller implementing:
- a collection module for assembling resources relating to the designated task or the conversation into a collection;
- a security module for allocating security permissions for users to access said resources in the collection over the network based on whether the users are active or passive participants in the task or the conversation, whereby the active participants have been invited to participate in the task or the conversation and the passive participants have not been invited to participate in the task or the conversation; and
- an output module for communicating the security permissions allocated for each of the users to access said resources in the collection to the providers of the resources, such that the providers set the security permissions for each of the users to access the resources.

According to another aspect of the present disclosure there is provided computer program code which when executed implements the above method.

According to another aspect of the present disclosure there is provided a tangible computer readable medium including the above program code.

According to another aspect of the present disclosure there is provided a data file including the above program code.

BRIEF DESCRIPTION OF THE DRAWINGS

Embodiments of the present disclosure will now be described, by way of example only, with reference to the accompanying drawings, in which.

DETAILED DESCRIPTION OF THE PREFERRED EMBODIMENTS

Figure 1:
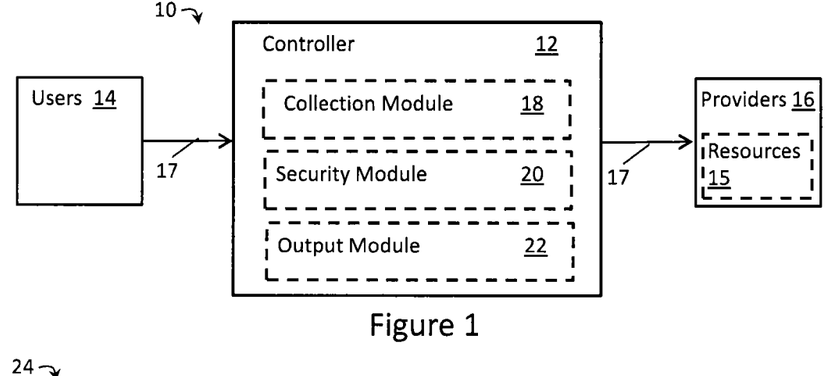
FIG. 1 is a schematic diagram of a system for system for managing user security permissions for access to resources that are provided by providers according to an embodiment of the present disclosure.

According to an embodiment, there is provided a system 10 for managing user security permissions for users 14 to access resources 15 that are provided by providers 16 so that the users 14 can participate in a designated task or conversation relating to the resources 15, as shown in FIG. 1. The resources 15 are accessible over a communications network 17 and it can be seen from this figure that the users 14 access an intermediary controller 12 to manage security permissions over the communications network 17 so that the users 14 can access the resources 15 provided by the providers 16. It will be appreciated by those persons skilled in the art that the intermediary controller 12 can also be implemented at either the user side or the provider side so that the users can access the resources 15 over the communications network 17, which is, say, the Internet. It will also be appreciated that the communications network 17 could also be a private network.

The intermediary controller 12 implements a number of modules to manage the user security permissions including a collection module 18 for assembling resources relating to a designated task or conversation into a collection. It will be appreciated by those persons skilled in the art that the controller includes a processor and memory (not shown) to implement these modules.

Secondly, the intermediary controller 12 includes a security module 20 for allocating security permissions for users to access the resources 15 in the collection over the communications network 17 based on whether the users 14 are active or passive participants in the task or the conversation. As described, the active participants are users that have been invited to participate in the task or the conversation and the passive participants have not been invited to participate in the task or the conversation. The intermediary controller 12 further includes an output module 22 for communicating the security permissions allocated for each of the users 14 to access the resources 15 in the collection to the providers 16 of the resources 15, such that the providers 16 set the security permissions for each of the users 14 to access the resources 15.

Figure 3:
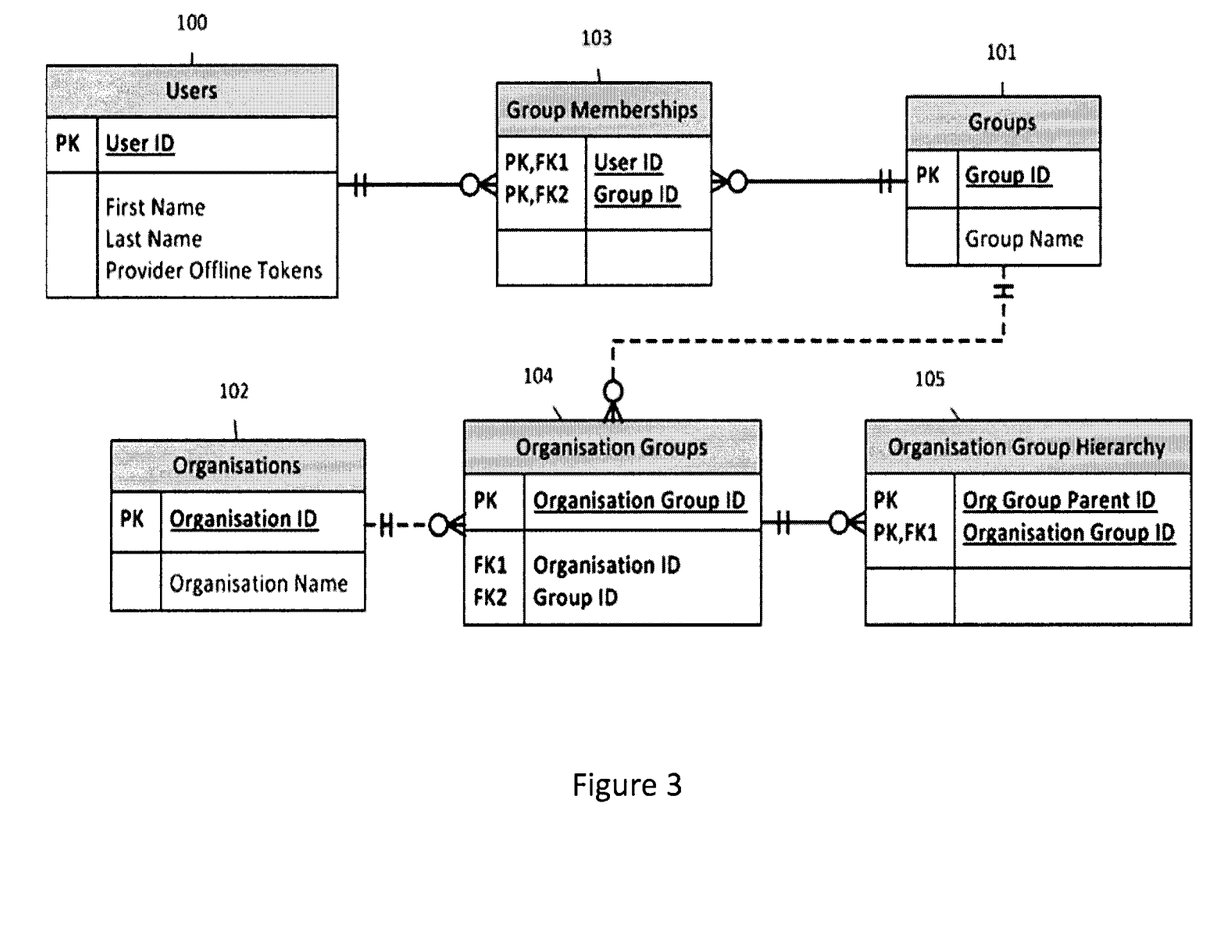
FIG. 3 is a schematic diagram of user relationships according to an embodiment of the present disclosure.

As described, the users 14 in certain situations require security permissions to access specific resources 15. FIG. 3 shows users 100 including an individual person or a group member 103 of one or more groups 101. Groups 101 can exist as entities themselves, for example a special interest group, or can also be members of organisations 102, for example the finance department within a company. That is, the group 101 can belong to one or more organisations 102 so that a user 100 can be a member of a group 101 and an organisation 102. Moreover, the different groups have designated permissions for accessing resources. In this way, security permissions can be allocated to users 100 both based on whether they are active or passive participants in a task or conversation relating to the resources and their membership with a group 101 and/or organisation 102.

Where a plurality of groups 101 exists within organisations 102, there can be a hierarchy 105 that defines which groups 101 are part of which larger parent groups. Accordingly, the user 100 can belong to one or more of these hierarchical groups 105 which may affect the security permissions allocated to the user 100. For example, users in an executive group may be allocated greater access to resources than users in a staff group of an organisation. Also, users 100 are grouped within the same organisational group 104 by either choosing to connect or automatically connecting with the other group members by virtue of belonging to the same organisation group 104.

Figure 4:
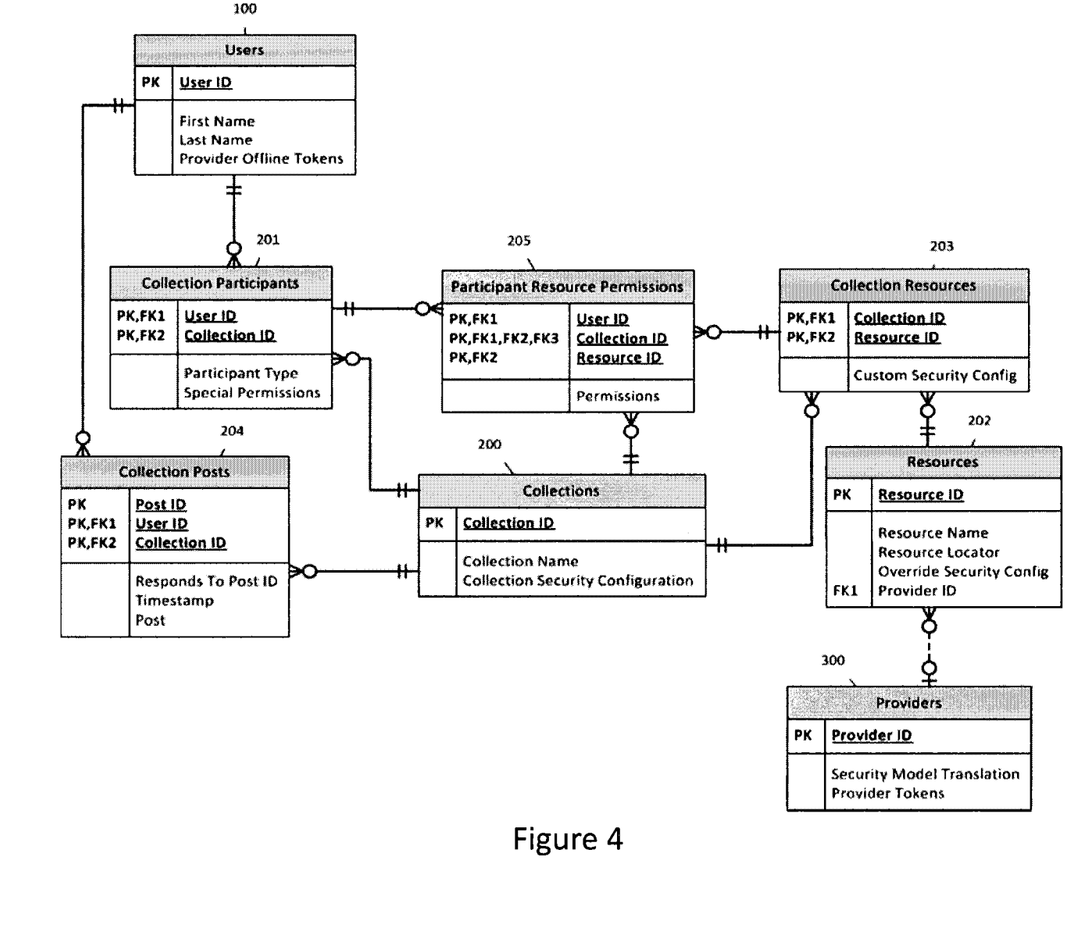
FIG. 4 is a schematic diagram illustrating relationships between the users and providers according to the system of FIG. 1.

With reference to FIG. 4, collections 200 represent the situation in which there is a need for security permissions to be allocated to the users 100; that is, when a resource, provided by a provider, is to be accessed by a user 100. The collections 200 are an assemblage of collection resources 203 relating to a designated task or conversation on those collection resources 203 as well as data indicative of the active or passive collection participants 201 in the task or conversation. The collections 200 can be seen in FIG. 4 to include data indicative of the collection resources 203, the collection participants 201, as well as communications in the form of collection posts (and comments) 204 and participant resource permissions 205. As described, the resources 202 require security permissions to be accessed and the collection posts (and comments) 204 represent the conversation and collaboration on those resources 202 by users 100. For instance, the users 100 are active participants if they have been invited, generally by a user 100 with a designated permission, to invite other users, to, say, comment on the resources 202. The active and passive participants 201 have not been invited, but, in one example, may be granted permission to view the resources 202 only and not comment depending on a collection security configuration. In another example, the passive collection participants 201 are granted permission to write to resources 202 such as files. It can be seen from this figure that the active and passive collection participants 201 include the users 100 who need the security permissions to access the resources 202 and who are assembled into the collection 200.

The collection security configuration defines the permissions that can be granted to a user 100 based on whether they are active or passive collection participants 201 in the tasks and conversations on the resources 202 in the collection 200, and which groups 101 and organisations 102 they belong to. Active and passive collection participants 201 can also be granted special individual resource permissions 205 to the collection resources 203. In this way, when a user 100 is added to a collection 200, a resource permission change mechanism automatically allocates the user 100 access to the collection resources 203 based on the collection security configuration.

The security permissions for the collection security configuration include the ability of the user 100 to: view the resources 202, comment on the resources 202, edit the resources 202, delete the resources 202, and control permissions for other users 100 to the resources 202. In addition, the owner of the resources 202 may get allocated special permission to the resources 202. In an example, the resources 202 include links to files, web sites and other Internet resources, such as Google Docs™ and Office 365™ documents, which are provided by providers 300 and collaborated on by the active and passive collection participants 201.

It will be appreciated by those persons skilled in the art that the security permissions are not static and that permissions can be removed for users 100 to access resources 202 in a collection 200. Indeed, when a user 100 is removed from a collection 200, a resource 202 permission change mechanism automatically removes the user 100 access to the collection resources 203 based on the designated rules in the collection security configuration.

Also, the resources 202 can have an override security configuration which takes precedence over any other security permission. The override security configuration for a resource can be set by a user 100 who is an owner of the resource 202. That is, the permission policies set by the providers of the resources 202 override the permission policies allocated to the users 100 based on the collection security configuration. For example, a provider 300 (e.g. owner) of a resource 202 can set: who can view the resource 202; who can view and comment in the resource 202; who can edit the resource 202 who can delete the resource 202, who can control security for the resource 202, and who can be assigned as the owner of the resource 202, irrespective of whether the users 100 are active or passive participants 201 in the task or conversation relating to those resources 202. In the example, the provider 300 can set further security policies, such as any active participant within a set of selected groups 101 or organisations 104 can access the resources 202, any active participant, or only participants explicitly given permission.

The collection security configuration is implemented by a security model, which defines the types of access that can be allocated to active and passive collection participants 201 to access the resources 202. These allocated security permission are then translated by a security to provider translation mechanism into the equivalent permissions where possible on providers' 300 system. The translated security permissions are then communicated to the providers 300 of the resources 202 so that the providers 300 can set the security permissions for the each of the users 100 to access the resources 202.

In an example, the security model includes the following permissions: none—no access will be allocated to the resource 202; view—the user 100 can view but not modify the resource 202; view and comment—the user 100 can both view the resource 202 and also make comments within it; edit—the user 100 can view, comment on and change the contents in the resource 202; delete—the user 100 can delete the resource 202; control resource security—the user 100 can assign security permissions to other users 100 for a resource 202; and owner—the user 100 is one of the owners of a resource 202.

The collection security configuration defines how the security model is applied to active and passive participants 201 and resources 203 within a collection 200. That is, the collection security configuration is the default security model to be applied to the active and passive collection participants 201 who require access to resources 202. The collection security configuration, however, allows for individual participants 201 to be given individual special permissions which apply to them only. These special permissions can be the granting of additional rights or the downgrading of rights from the default security configuration. Individual collection resources 203 can also override the collection security configuration with their own custom security configuration which is essentially the same as a collection security configuration, except that it only applies to that one collection resource 203 in the specific collection 200.

The collection security configuration is a set of security settings that are stored with the collection 200 entity. The active and passive collection participants 201 records contain any special permissions that have been granted to individual participants. The participant resource permissions 205 define and record the level of access each individual active and passive participant 201 has to each collection resource 203.

For the purposes of the collection security configuration settings below, users can be both internal and external; internal users are those internal to an organisation if the collection 200 is owned by a user 100 in an organisation 104. Otherwise internal users are those who are group members 103 of the group 101 if the collection 200 is owned by a user 100 in a group 101. External users are all other users. To simplify the process of configuring security for a collection 200, a choice will be provided between simplified security settings or detailed security settings.

The simplified collection security configuration settings include that internal participants should be able to do one of the following: view and discuss resources 202; collaborate on resources 202; and have full control over resources 202. Also, external participants are either not permitted or must request permission before participating.

The detailed collection security configuration settings include settings for: who can assign ownership of the collection 200; who can invite internal users; who can invite external users; who can approve participation requests from internal users; who can approve participation requests from external users; who can control the invitation criteria for passive participants; who can remove internal participants; who can remove external participants; and who can delete the collection 200. Furthermore, without removing any existing permissions: who can view resources 202; who can view and comment in resources 202; who can edit resources 202; who can delete resources 202; who can control resource 202 security; who will be automatically assigned as owner of resources 202; who can set security permissions for the collection 200; who can view the active participant list; who can view posts and comments. Also, one of these three options can be set for each of the above policies: any active participant within a set of selected groups 101 or organisations 102; any active participant (internal or external); and only participants explicitly given permission.

Further collection security configuration settings involve, when an active and passive collection participant 201 is removed from the collection or a resource 202 is removed from the collection 200, which of these permissions on resources 202 should be removed if they aren't an owner of a resource 202 and don't have permission through another collection 200. The choices are: access; view; view and comment; edit; delete; control resource security; ask for each individual.

Further collection security configuration settings are: can users 100 within the owner's organisation 104 or group 101 who discover this collection 200 participate in a passive way; and can users 100 external to the owner's organisation 104 or group 101 who discover this collection 200 participate in a passive way. The choices are: no and yes. Also, a user 100 can request permission to become an active or passive participant 201 (in this case passive).

Further collection security configuration settings are to: allow internal passive participants to see the list of active participants; and allow external passive participants to see the list of active participants. Without affecting any existing permissions, the collection security configuration settings include which passive participants can access resources 202; which passive participants can view resources 202; which passive participants can view and comment in resources 202; which passive participants can edit resources 202; which passive participants can delete resources 202; and which passive participants will be automatically assigned as owner of resources 202. The choices are: none; only passive participants internal to the organisation 104; only passive participants internal to the group 101; and any passive participant.

Further collection security configuration settings are to: allow internal passive participants to see posts and comments; and allow external passive participants to see posts and comments.

As described, the resource permission change mechanism applies the collection security configuration to active and passive collection participants 201 as they are assembled (e.g. added) or removed from the collection 200. The resource permission change mechanism also creates and removes the permissions each active and passive collection participants 201 has to the collection resources 203. The providers 300 each have their own unique security model that defines, amongst other things, the types of permissions that can be allocated for access to resources 202.

The provider 300 includes a security model translation for each provider 300 as a record containing the security model permissions and the settings for translating them. The record contains a set of: security model permission; does provider have direct equivalent (true/false); provider equivalent permission; and fall-back provider equivalent permission (if no direct equivalent).

Figure 5:
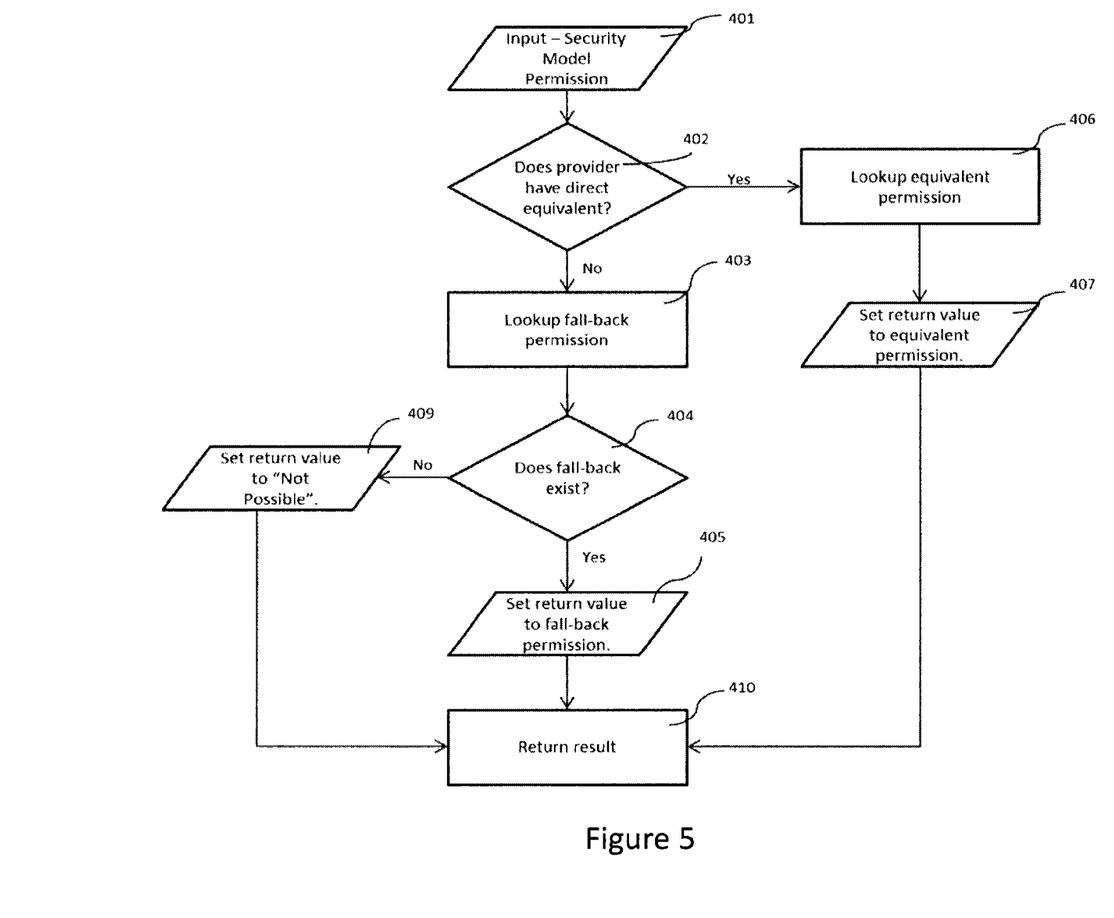
FIG. 5 is a flow chart that illustrates translating an allocated permission to the equivalent permission for the provider according to an embodiment of the present disclosure.

The translating mechanism for translating the security permissions allocated to the users to access the resources 202 in the collection 200 to a provider model for use by the providers 300 to set the security permissions for the users 100 is shown in FIG. 5. That is, a flow chart illustrates translating a given model permission 401 from the security model into the equivalent permission on the provider's system. With the given security permission 401, it must first be determined whether there is a direct equivalent on the provider's system 402. If there is an equivalent 406, it is returned as the translated permission 407. If there is no direct equivalent permission 402, the fall-back permission is determined 403. If there is no fall-back 409, the translation result is not possible. If there is a fall-back 403, it is returned 410 as the translated permission 405.

The resource permission change mechanism utilises a provider interface mechanism to enact the participant resource permissions 205 to be applied to resources 202 for each collection participant 201. The resource permission change mechanism also actions changes to security permissions on resources 202 when either participants 201 or collection resources 203 are added and removed from a collection 200.

A provider interface mechanism communicates the provider model so that the providers 300 can set the security permissions for the users 100 and has a set of methods for each provider 300. Specifically, the mechanism calls a provider's 300 application programming interface (API) to modify permissions on the resources 202. New providers 300 can also be included by developing a set of methods for that provider using the interface.

Providers systems have their own unique ways of requiring other systems to identify themselves using their own set of required tokens. To cater for this, each provider 300 record contains a set of provider tokens which are name and value pairs. They store the name of a provider token or identifier and the value for that token. The tokens are used by the provider interface mechanism where required by the provider's API.

In addition, to ensure collection participants 201 don't have to be logged in when users are added and removed from a collection 200, the user 100 record contains a set of offline tokens for each provider 300. These tokens allow the user 100 to authorise the application to make permission changes to resources 202 that they own on their behalf. The offline tokens are used by the provider interface mechanism where required and supported by the provider's API.

Figure 6:
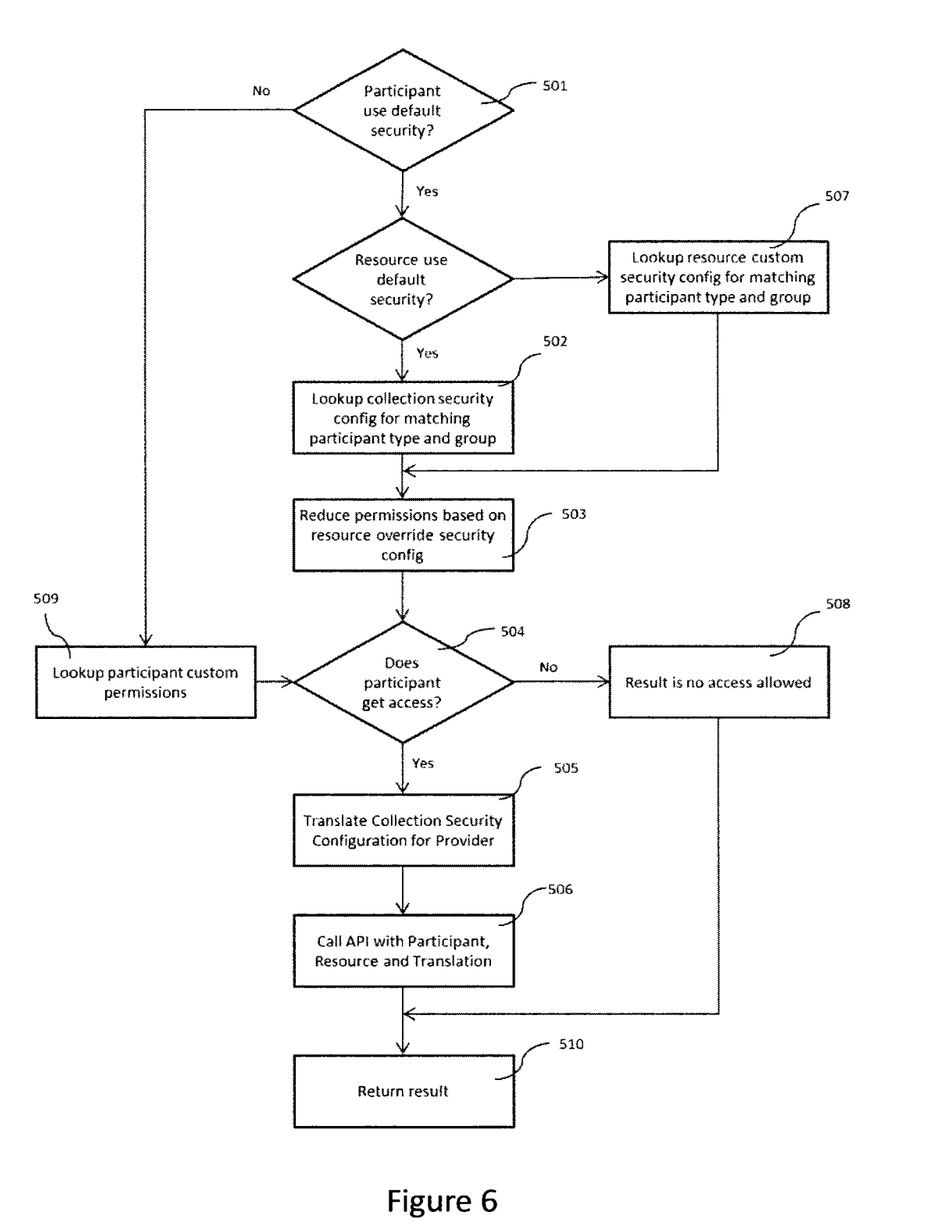
FIG. 6 is a flow chart that illustrates allocating a permission to a participant to access a resource according to an embodiment of the present disclosure.

FIG. 6 illustrates allocating access for a participant to a resource 202. A participant's access permissions could be based on custom permissions 509, the default collection security configuration 502 or a custom security configuration for the specific resource 507. If based on the default collection security configuration 502 or a custom security configuration for the resource 507, the participant type (active or passive) and their group 101 and organisation 102 membership must be matched to those within the security configuration. Nonetheless, the resulting permissions may then be reduced if the resource 202 has an override security configuration 503.

After evaluation, if the participant has one or more permissions, they need to be translated 505 for the relevant provider. The provider's API is then used to set permissions on the resource for the participant 506.

Figure 7:
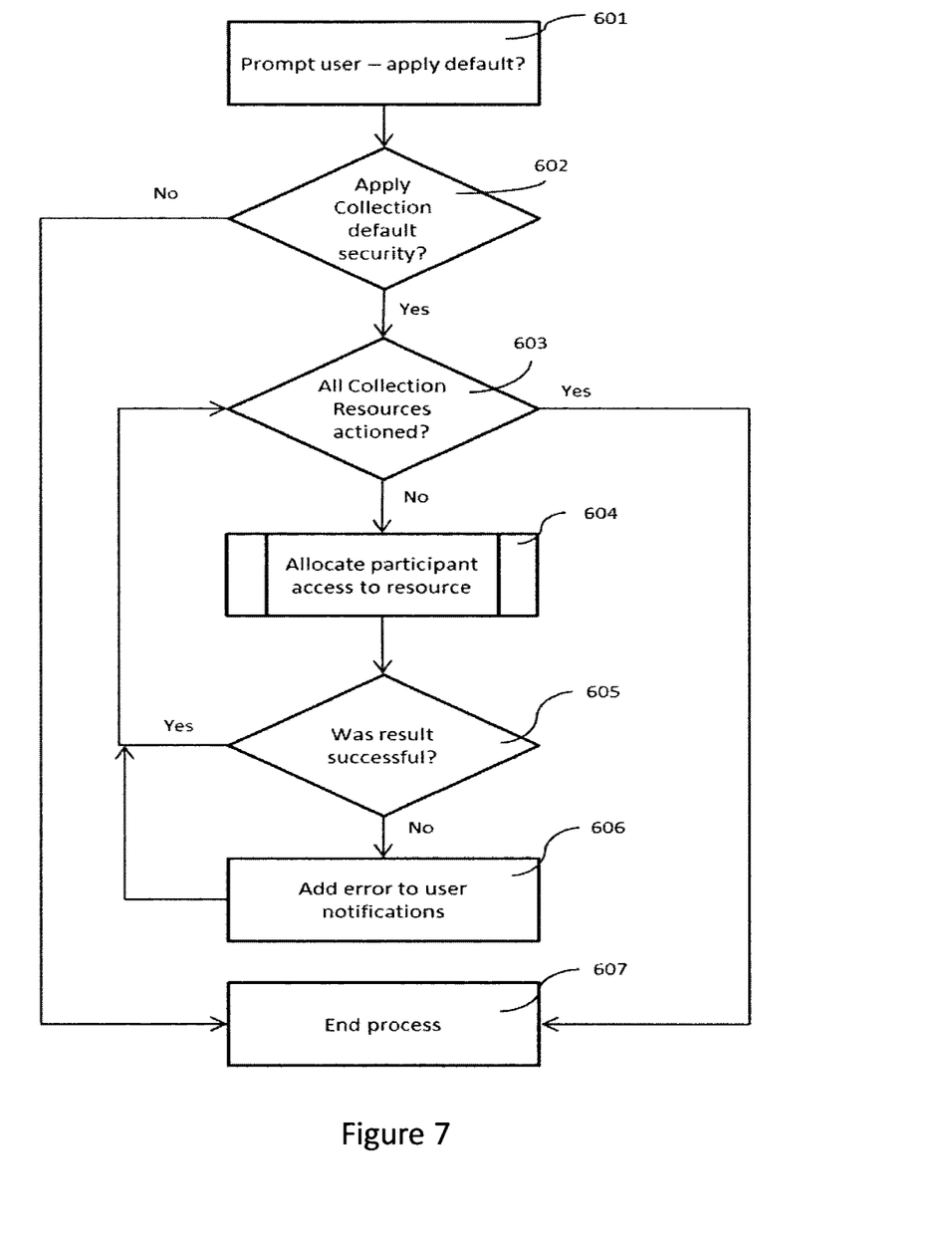
FIG. 7 is a flow chart that illustrates assembling a participant into a collection according to an embodiment of the present disclosure.

FIG. 7 illustrates adding data indicative of a participant to a collection. The system (or user in some instances) adding the participant is prompted 601 whether to apply the default collection security configuration or custom permissions 602. If custom permissions are to be applied no further action is taken 607. The system can later apply these on a collection resource, by collection resource basis. If the default collection security configuration 602 is to be applied, each collection resource 203 is considered in succession 603. For a given resource, the process shown in FIG. 6 is followed 604 to allocate the participant with permission to access the resource 202. For a given resource, the process will be either successful or will fail. If it fails 605, the user will need to be notified 606.

Figure 8:
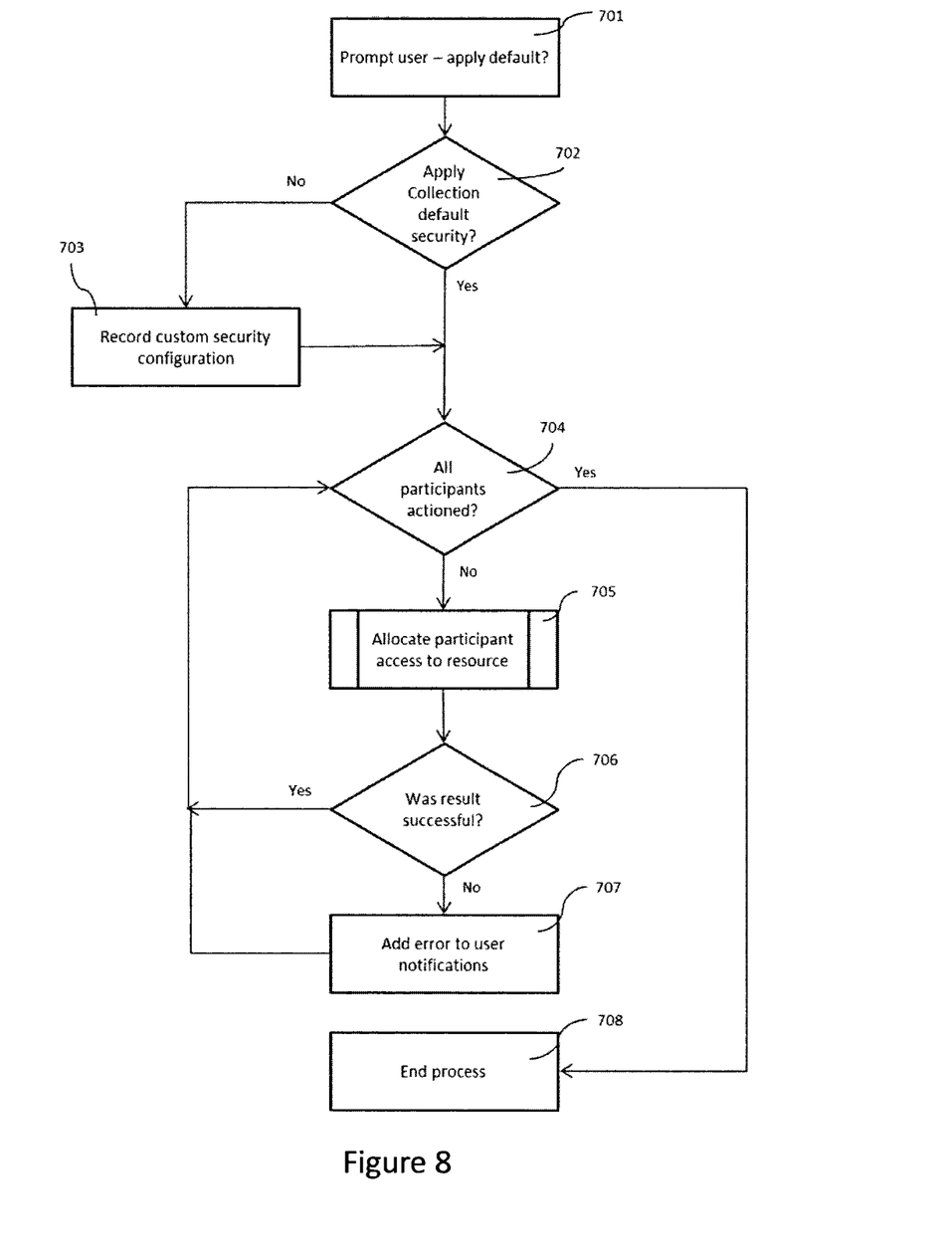
FIG. 8 is a flow chart that illustrates assembling a resource into a collection according to an embodiment of the present disclosure.

FIG. 8 illustrates the process followed when a resource is added to a collection. The user adding the resource 202 is firstly prompted to determine whether the default collection security configuration should be applied to the resource 701. If the default collection security configuration isn't to be applied 702, a custom security configuration is recorded 703 and stored in the collection resources 203. Each participant is then considered in turn, as shown in step 703. A pre-defined process is followed 705 to give the participant access to the resource 202. For a given resource 202 and participant, the process will be either successful or will fail. If it fails 706, the user 100 will need to be notified 707.

Figure 9:
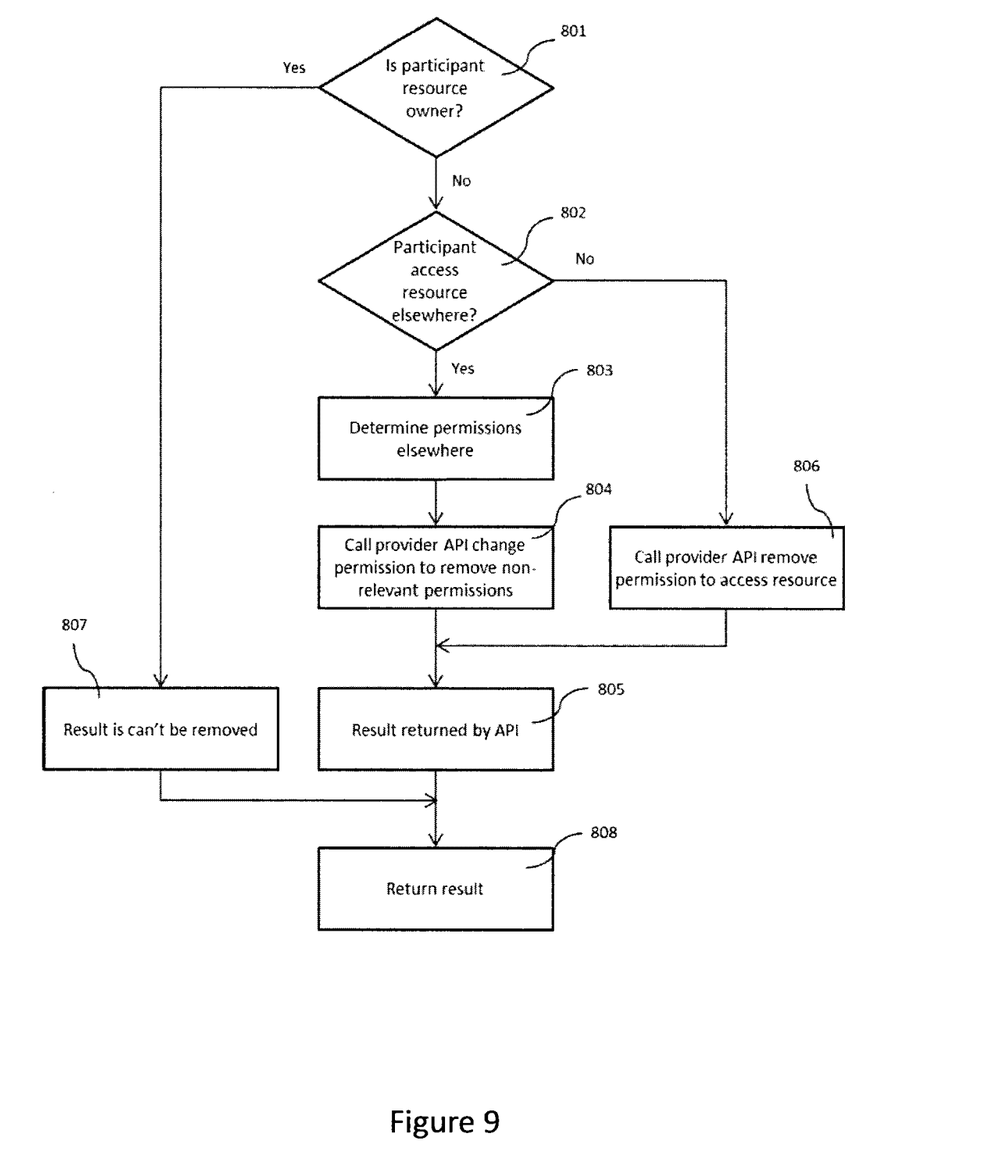
FIG. 9 is a flow chart that illustrates removing permissions for a participant to access to a resource according to an embodiment of the present disclosure.

FIG. 9 illustrates the process followed to remove a participant's access to a resource 202. If the participant is an owner of the resource 801, no attempt is made 807 to remove or change their access to the resource 202. If the participant is not an owner of the resource 801, it is next determined whether they have access to that resource 202 through another collection 802. Where a participant has no other access to the resource 202, their access is removed entirely from the resource 806. Where a participant does have access to a resource 202 through other collections 802, their full set of permissions from the other resources is determined 803. The provider's API is then used to change permissions on the resource 202 to remove those not needed, but leave in place those still required 804.

Figure 10:
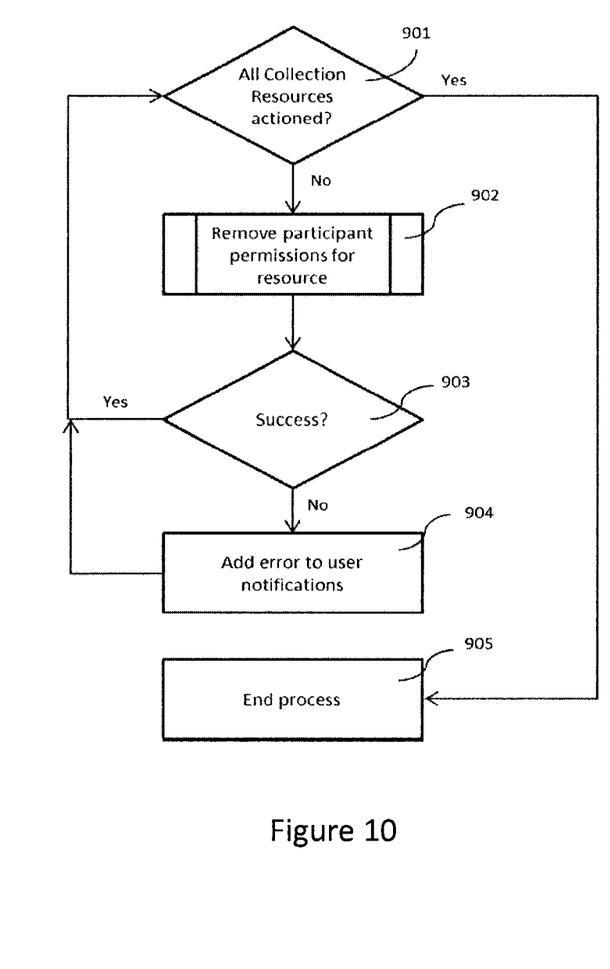
FIG. 10 is a flow chart that illustrates removing a participant from a collection according to an embodiment of the present disclosure.

FIG. 10 illustrates the process followed when a participant is removed from a collection 200. Each collection resource is considered in turn 901 until all have been processed. A predefined process, as shown in FIG. 9, is followed to remove the participant's permissions on the resource 202. Where permission cannot be removed, the error is added 904 to a list of notifications to be displayed to the user after the process has completed.

Figure 11:
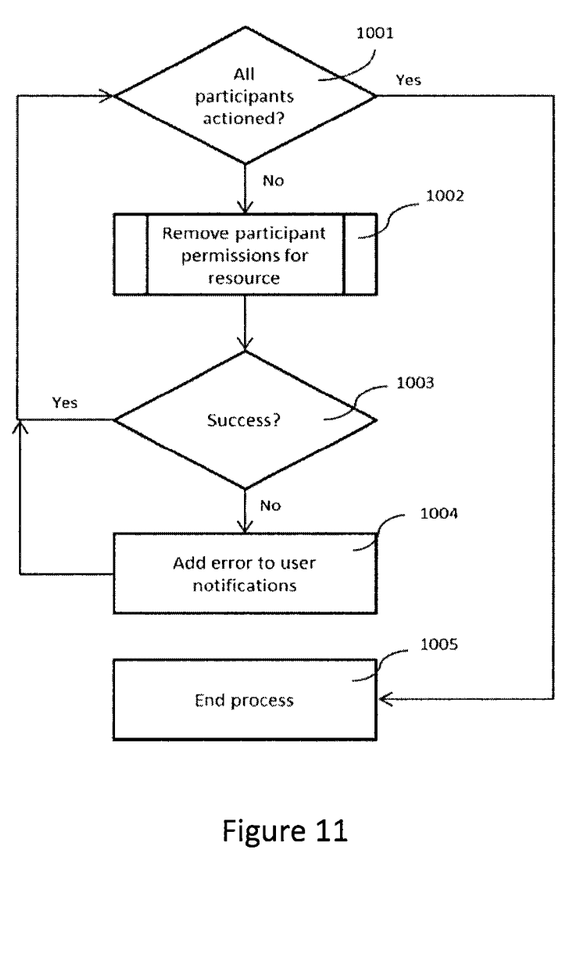
FIG. 11 is a flow chart that illustrates removing a resource from a collection according to an embodiment of the present disclosure.

FIG. 11 illustrates the process followed when a resource 202 is removed from a collection 200. All participants are considered and processed in succession 1001. A pre-defined process, as shown in FIG. 9, is followed to remove the participant's permissions on the resource 202. Where a permission cannot be removed, the error is added 1004 to a list of notifications to be displayed to the user after the process has completed.

Figure 2:
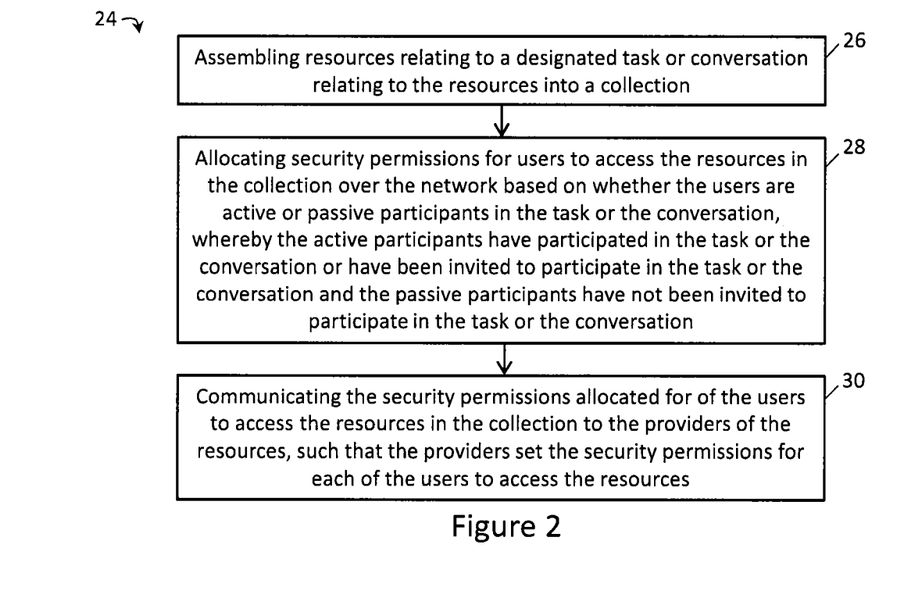
FIG. 2 is a flow chart of a method of managing user security permissions for access to resources that are provided by providers according to an embodiment of the present disclosure.

Referring back to FIG. 2, there is shown a summary of a computer implemented method 24 of managing user security permissions for access to resources 202 that are provided by providers 300, to participate in a designated task or conversation relating to the resources 202, and are accessible over a communications network 17. The method including assembling resources 26 relating to the designated task or the conversation into a collection 200, allocating 28 security permissions for users to access said resources in the collection 200 over the network based on whether the users 100 are active or passive participants in the task or the conversation, whereby the active participants have been invited to participate in the task or the conversation and the passive participants have not been invited to participate in the task or the conversation, and communicating 30 the security permissions allocated for each of the users 100 to access said resources 202 in the collection 200 to the providers 300 of the resources 202, such that the providers 300 set the security permissions for each of the users 100 to access the resources 202.

Further aspects of the method will be apparent from the above description of the system. Persons skilled in the art will also appreciate that the method could be embodied in program code. The program code could be supplied in a number of ways, for example on a tangible computer readable medium, such as a disc or a memory or as a data signal or data file (for example, by transmitting it from a server).

It is to be understood that various alterations, additions and/or modifications may be made to the parts previously described without departing from the ambit of the present disclosure, and that, in the light of the above teachings, the present disclosure may be implemented in software, firmware and/or hardware in a variety of manners as would be understood by the skilled person.

The discussion of documents, acts, materials, devices, articles and the like is included in this specification solely for the purpose of providing a context for the present disclosure. It is not suggested or represented that any or all of these matters formed part of the prior art base or were common general knowledge in the field relevant to the present disclosure as it existed before the priority date of each claim of this application.

What is claimed is:

1. A method of managing user security permissions for access to resources for users to participate in a designated task or conversation relating to the resources, the method performed by a processor in accordance with a program embodied in a memory, wherein the program is readable and executable by the processor and causes the processor to perform steps of:

assembling the resources provided by a network system of providers relating to the designated task or conversation into a collection, wherein the resources are accessible over a communication network via one or more provider-supplied computer interfaces of the network system of the providers, wherein different predetermined security permissions are allocated for the users to access the collection, and wherein one security permission allocated to the users allows the collection to be discoverable by the users;

allocating the different predetermined security permissions by defining types of access that can be allocated for the users to access the resources in the collection over the communication network based on whether the users are active or passive participants in the designated task or conversation, wherein the one security permission allocated to the users allows the active or passive participants to discover the collection, wherein the active participants have been invited to participate in the designated task or conversation, wherein the passive participants have not been invited to participate in the designated task or conversation, and wherein the users having the one security permission to discover the collection can participate passively; and communicating to the providers via the one or more provider-supplied computer interfaces the different predetermined security permissions to allow the providers to set or override the allocated security permissions for each of the users to access the resources.

2. The method as claimed in claim 1, further comprising allocating the different predetermined security permissions for the users to access the resources in the collection based on whether the users are members of a designated group with designated permissions for the resources.

3. The method as claimed in claim 2, wherein the different predetermined security permissions include permission policies of a security model to: view the resources; comment on the resources; edit the resources; delete the resources; control permissions for other users to access the resources; and own the resources.

4. The method as claimed in claim 3, further comprising allocating the permission policies to any one of: the users that are the active participants in the designated task or conversation and are members of the designated group; the users that are the active participants in the designated task or conversation; the users that have the designated permissions for the resources; and the users that are the passive participants in the designated task or conversation.

5. The method as claimed in claim 4, further comprising the providers setting the permission policies based on the allocated security permissions communicated thereto for any one of: the users that are the active participants in the designated task or conversation and are members of a designated group; the users that are the active participants in the designated task or conversation; the users that have the designated permissions for the resources; and the users that are the passive participants in the designated task or conversation.

6. The method as claimed in claim 5, wherein the permission policies set by the providers override the permission policies allocated to the users to access the resources in the collection.

7. The method as claimed in claim 1, further comprising translating the allocated security permissions for each of the users to access the resources in the collection to a provider security permission model for use by the providers to set the allocated security permissions for each of the users to access the resources.

8. The method as claimed in claim 7, further comprising interfacing with the providers to communicate the provider security permission model so that the providers set the allocated security permissions for each of the users to access the resources.

9. The method as claimed in claim 1, further comprising assembling data indicative of the active participants and the passive participants in the designated task or conversation into the collection.

10. The method as claimed in claim 9, further comprising assembling data indicative of communications on the resources created by the users participating in the designated task or conversation into the collection.

11. The method as claimed in claim 9, further comprising assigning the allocated security permissions for the users to access the resources in the collection based on the data indicative of the active participants and the passive participants assembled into the collection.

12. The method as claimed in claim 11, further comprising removing the allocated security permissions for the users to access the resources in the collection in response to the data indicative of the active participants and the passive participants being removed from the collection.

13. A system for managing user security permissions for access to resources for users to participate in a designated task or conversation relating to the resources, the system comprising;

a controller having a processor coupled with a memory that has a program embodied therein, wherein the program is readable and executable by the processor to cause the processor to perform steps of:

assembling the resources provided by a network system of providers relating to the designated task or conversation into a collection, wherein the resources are accessible over a communication network via one or more provider-supplied computer interfaces of the network system of the providers, wherein different predetermined security permissions are allocated for the users to access the collection, and wherein one security permission allocated to the users allows the collection to be discoverable by the users;

allocating the different predetermined security permissions by defining types of access that can be allocated for the users to access the resources in the collection over the communication network based on whether the users are active or passive participants in the designated task or conversation, wherein the one security permission allocated to the users allows the active or passive participants to discover the collection, wherein the active participants have been invited to participate in the designated task or conversation, wherein the passive participants have not been invited to participate in the designated task or conversation, and wherein the users having the one security permission to discover the collection can participate passively; and communicating to the providers via the one or more provider-supplied computer interfaces the different predetermined security permissions to allow the providers to set or override the allocated security permissions for each of the users to access the resources.

14. A non-transitory computer readable storage medium for managing user security permissions for access to resources for users to participate in a designated task or conversation relating to the resources, the computer readable storage medium comprising a program embodied therein, wherein the program is readable and executable by a processor to cause the processor to perform steps of:

assembling the resources provided by a network system of providers relating to the designated task or conversation into a collection, wherein the resources are accessible over a communication network via one or more provider-supplied computer interfaces of the network system of providers, wherein different predetermined security permissions are allocated for the users to access the collection, and wherein one security permission allocated to the users allows the collection to be discoverable by the users;

allocating the different predetermined security permissions by defining types of access that can be allocated for the users to access the resources in the collection over the communication network based on whether the users are active or passive participants in the designated task or conversation, wherein the active participants have been invited to participate in the designated task or conversation, wherein the one security permission allocated to the users allows the active or passive participants to discover the collection, wherein the passive participants have not been invited to participate in the designated task or conversation, and wherein the users having the one security permission to discover the collection can participate passively; and communicating to the providers via the one or more provider-supplied computer interfaces the different predetermined security permissions to allow the providers to set or override the allocated security permissions for each of the users to access the resources.

\* \* \* \* \*